United States Patent [19]

Lowry et al.

[11] Patent Number: 5,259,564
[45] Date of Patent: Nov. 9, 1993

[54] INTEGRAL REEL SPRING/REMOVABLE DUST DOOR COMBINATION

[75] Inventors: Alan Lowry, Canton, Mass.; Craig Lovecky, Old Orchard Beach, Me.

[73] Assignee: Shape Inc., Biddeford, Me.

[21] Appl. No.: 940,741

[22] Filed: Sep. 8, 1992

Related U.S. Application Data

[63] Continuation of Ser. No. 676,341, Mar. 28, 1991, abandoned.

[51] Int. Cl.$^5$ .................. G11B 23/02; G11B 23/087
[52] U.S. Cl. .................................... 242/199; 206/387
[58] Field of Search ............ 242/199, 200, 198, 197; 360/132; 206/387

[56] References Cited

U.S. PATENT DOCUMENTS

| | | | |
|---|---|---|---|
| Des. 286,630 | 11/1986 | Kisanuki | D14/11 |
| Des. 304,938 | 12/1989 | Lowe et al. | D14/121 |
| 4,102,514 | 7/1978 | Ito | 242/199 |
| 4,119,200 | 10/1978 | Cassidy et al. | 206/387 |
| 4,140,219 | 2/1979 | Somers | 206/387 |
| 4,304,331 | 12/1981 | Minkow | 206/387 |
| 4,322,000 | 3/1982 | Struble | 206/387 |
| 4,368,860 | 1/1983 | Goto | 242/199 |
| 4,526,330 | 7/1985 | Shimizu | 242/199 |
| 4,545,550 | 10/1985 | Wolf et al. | 206/387 X |
| 4,629,144 | 12/1986 | Schoettle | 360/132 X |
| 4,648,563 | 3/1987 | Tollefson | 242/199 X |
| 4,662,579 | 5/1987 | Gelardi et al. | 242/199 |
| 4,697,702 | 10/1987 | Urayama | 360/132 X |
| 4,757,896 | 7/1988 | Huko | 206/387 |
| 4,771,888 | 9/1988 | Lundeen | 206/387 |
| 4,802,044 | 1/1989 | Iwahashi et al. | 242/199 X |
| 4,883,176 | 11/1989 | Hart et al. | 206/387 |
| 4,986,491 | 1/1991 | Gelardi et al. | 206/387 X |
| 4,995,565 | 2/1991 | Urayama et al. | 242/199 X |
| 5,092,536 | 3/1992 | Gelardi et al. | 242/199 |

FOREIGN PATENT DOCUMENTS

WO88/08196 10/1988 PCT Int'l Appl. .
1580505 12/1980 United Kingdom .

Primary Examiner—Daniel P. Stodola
Assistant Examiner—John Rollins
Attorney, Agent, or Firm—Staas & Halsey

[57] ABSTRACT

A pair of spaced reel springs are integrally molded on a cassette cover to extend inwardly and downwardly at an angle. When the cassette cover and base are mated, the springs bias movable tape reels against the cassette base. A removable dust door includes an extension having a pair of integrally formed projections. The projections extend, when the removable dust door is positioned on the cassette, into openings formed in the tape cassette around the reel springs. The projections abut the springs, hold the tape reels against the cassette base and relieve the load from the springs.

12 Claims, 4 Drawing Sheets

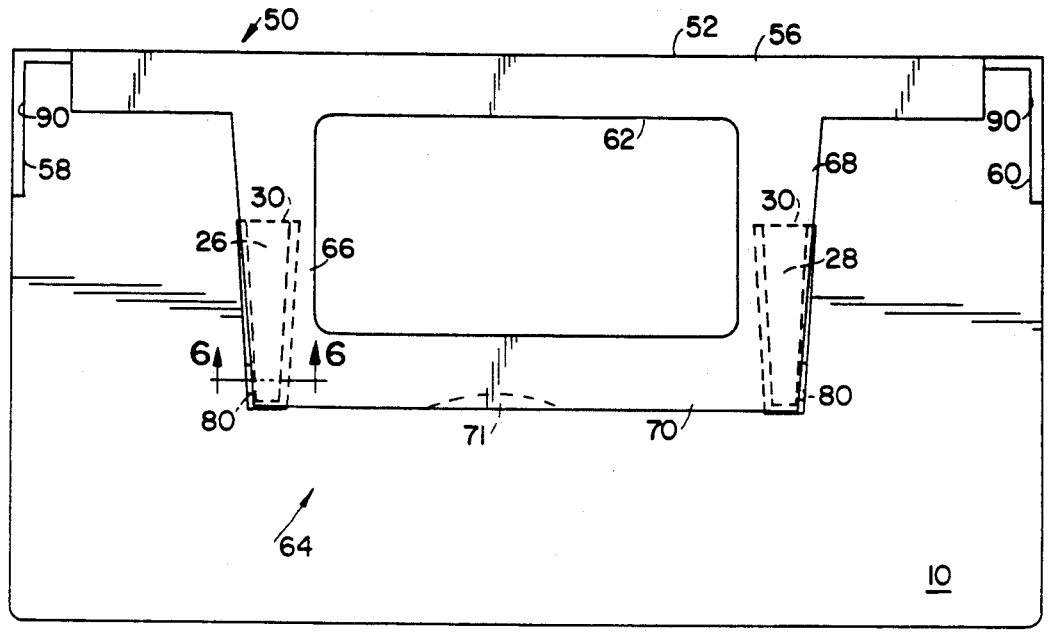
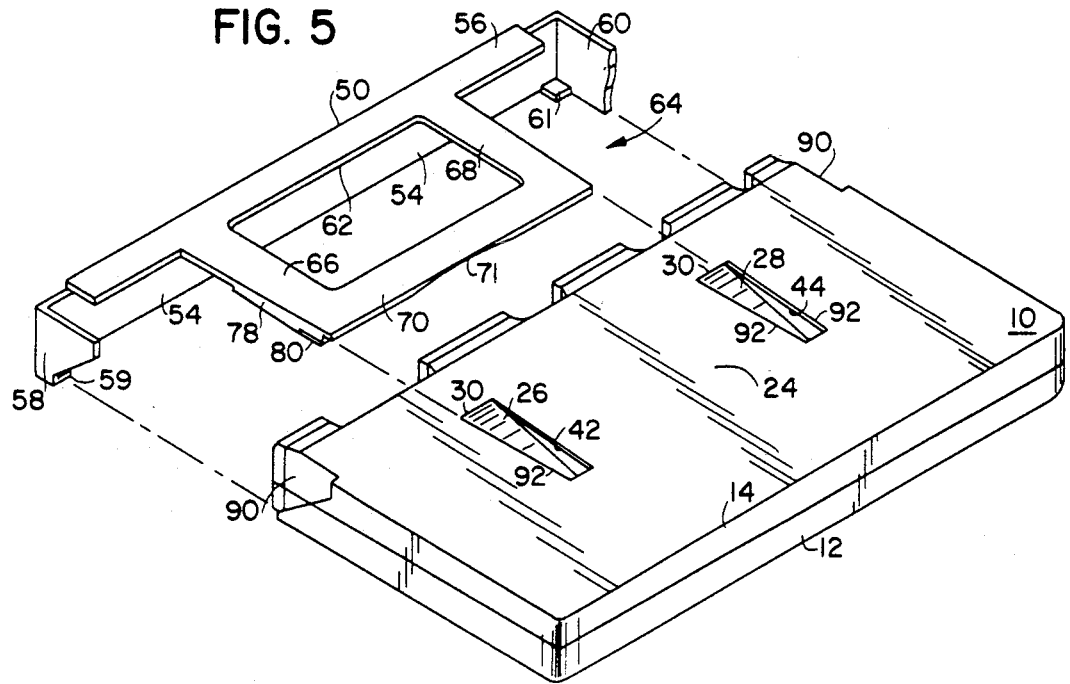

INTEGRAL REEL SPRING/REMOVABLE DUST DOOR COMBINATION

This application is a continuation of application Ser. No. 07/676,341, filed Mar. 28, 1991, now abandoned.

BACKGROUND OF THE INVENTION

This invention relates to tape cassettes and, more particularly, to a reel leaf spring of a video tape cassette cover for rotatably supporting the hubs of tape reels in the tape cassette, and a removable dust door which cooperates therewith.

A conventional video tape cassette includes a base and a cover, each made of plastic. The assembled base and cover accommodate a pair of tape reels, each including a hub for winding magnetic recording tape therearound.

The cassette also usually includes a separate reel leaf spring, i.e., a spring stamped from a flat piece of metal or alloy, such that arms are bent to extend from both sides of a central, flat portion of the spring, as described in Assignee's U.S. Pat. No. 4,662,579, entitled "Coined Reel Leaf Spring for a Video Tape Cassette." The central, flat portion of the reel leaf spring includes holes to receive projections formed on a central planar area of the underside of the cover. The free ends of the projections are swedged or post formed to extend around the holes and permanently hold the leaf spring relative to the cover.

With the arrangement described above, when the cover including the reel leaf spring is assembled with the base, both of the free ends of the arms of the spring contact the hubs of the respective tape reels and bias the tape reels downwardly, so that the tape reels are rotatably retained in position with adequate pressure to interface a tape player/recorder. That is, when the cassette is placed in the tape player/recorder, spindles of the tape player/recorder enter the hubs and lift the reels against the force of the spring. When the cassette is not in the tape player/recorder, the spring pushes the reels against the base and the reels are prevented from rotating by a reel lock device well known in the art. Alternatively, teeth on the cassette base could cooperate with teeth on the reel to lock the reels, as described in Assignee's co-pending U.S. patent application Ser. No. 07/471,648, entitled "Static Tape Cassette Reel Lock," now U.S. Pat. No. 5,052,632.

Assembly of this spring is relatively labor intensive. That is, the springs must be stamped and bent, the holes must be accurately formed, the corresponding projections must be molded on the cassette cover, the spring must be mounted so that the holes properly receive the projections, and the projections must be post formed. All of these steps, of course, raise the cost of the entire cassette.

Further, after positioning the spring on the cover, but before permanent connection, it is possible that the spring could be dislocated relative to the projections while progressing in the assembly line.

Moreover, with cassettes, as with all plastic consumer goods, a need exists to find ways to re-cycle the products instead of merely depositing them in land fills. Of course, the more difficult and expensive it is to separate different materials such as metal and plastic, in this case the spring from the cassette cover, the less incentive there is to recycle.

The Assignee's copending U.S. patent application Ser. No. 458,428, entitled "Reel Leaf Spring/Cassette Cover Combinations and Methods for Assembly" now U.S. Pat. No. 4,986,491, describes a reel leaf spring which is removably cam fit or press fit between projections or ramps formed on the cassette cover. This structure facilitates assembly and re-cycling by making it easier to install and remove the metal reel leaf spring relative to the cassette cover. Further, Assignee's co-pending application Ser. No. 676,380 entitled "Wire Reel Leaf Spring/Cassette Cover Combination and Methods for Assembly" now U.S. Pat. No. 5,199,661, describes a metal wire reel leaf spring which also shares these attributes.

However, the reel leaf springs discussed above still are not the most cost-efficient, nor do they lend themselves to the easiest fabrication and re-cycling.

A conventional cassette further includes a pivotable, spring biased dust door which, when closed, protects the tape from dust, contact, etc. An example of such a dust door is described in Assignee's U.S. Pat. No. 4,533,093, entitled "Tape Cassette Dust Door Spring Assembly and Method for Assembling Same." When the door is opened, usually automatically by a tape player/recorder when the cassette is placed therein, the magnetic head of the player/recorder can gain access to the tape.

Incorporating such a dust door in a cassette requires molding of the door, formation of a spring, installation of the spring on the dust door, loading of the spring against the cassette, producing, installing and loading a dust door latch and related spring, and biasly capturing the dust door between the base and cover as the base and cover are mated during assembly. This number of steps is not very cost-efficient. Further, there is always the chance that the parts, such as the dust door spring, could become misaligned during manufacture, shipping, handling or use, and fail to properly operate.

Finally, none of the prior art dust doors in any way cooperates with the reel spring to improve the resilient life thereof.

Assignee's co-pending U.S. application Ser. No. 610,585, entitled "REMOVABLE DUST DOOR INCORPORATING TAPE REEL LOCK," now abandoned, describes a removable dust door, but same also does not cooperate with a reel spring.

Thus, the dust doors discussed above still are not the most cost-efficient, nor do they lend themselves to the easiest fabrication and re-cycling and they fail to combine in any way with the reel spring.

SUMMARY OF THE INVENTION

Accordingly, it is a purpose of the present invention to provide a reel spring and dust door contributing to reducing overall production costs of the tape cassette.

It is another purpose of the present invention to provide a reel spring and dust door which are more ecological than conventional corresponding members by promoting material and energy conservation.

It is another purpose of the present invention to provide a tape cassette requiring fewer parts than conventional tape cassettes.

It is another purpose of the present invention to combine two separate members already used in a cassette into a single, integrally molded member capable of performing the functions of the previous two separate members.

It is another purpose of the present invention to provide a dust door requiring no assembly of parts into a video cassette or separate biased mounting.

It is another purpose of the present invention to provide a reel spring requiring no assembly of parts into a video cassette.

It is another purpose of the present invention to combine the operations of a reel spring with a dust door.

It is another purpose of the present invention to provide a reel spring/removable dust door combination for a video tape cassette which lacks moving or working parts, except cooperation between the dust door and the reel spring, to improve reliability.

To achieve the foregoing and other purposes of the present invention and in accordance with the purposes of the invention, there is provided a pair of reel springs molded integrally of the cassette cover. The reel springs are molded inwardly at an angle to the plane of the cover. Once the cover is mated with the base, with tape reels therebetween, the springs push the tape reels against the cassette base, where the tape reels are locked against rotation by other means. There is also provided a removable dust door which has formed thereon an extension having a pair of spaced projections. When the dust door is positioned on the cassette, the extension abuts the cassette cover and the projections extend through corresponding openings formed around the reel springs to abut these springs and hold the tape reels against the cassette base. Thus, no spring fatigue is realized until the door is removed. When the dust door is manually removed from the cassette, the projections disengage from the reel springs, and the tape is exposed for access by the tape player/recorder.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 4 is a top view of the tape cassette cover according to the present invention, illustrating particularly a removable dust door combined with the integral reel springs.

FIG. 5 is a perspective view of the dust door being removed/assembled relative to the cover.

DESCRIPTION OF THE PREFERRED EMBODIMENTS

Figure 1:
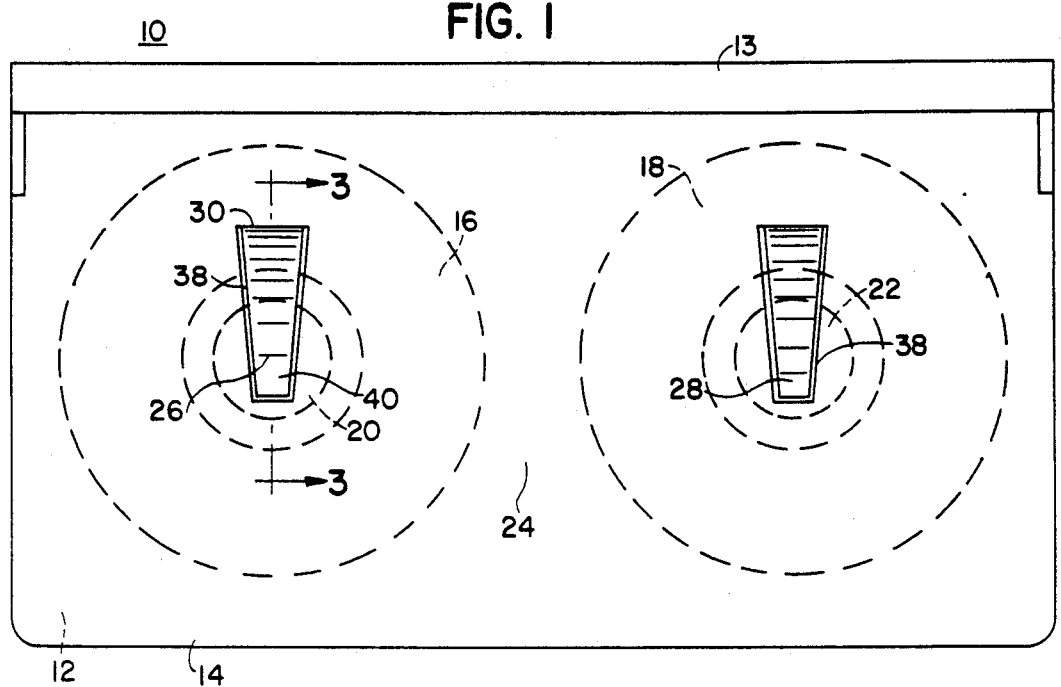
FIG. 1 is a top view of a tape cassette according to the present invention, illustrating particularly integral reel springs formed in the cover, but with a conventional dust door.
Figure 3:
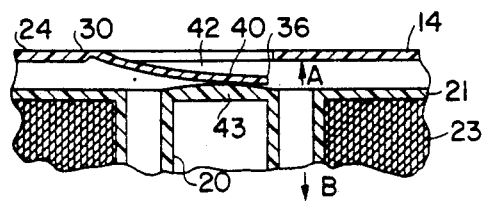
FIG. 3 is a side, cross-sectional view of one of the integrally formed reel springs biased against the top of a tape reel hub.
Figure 6:
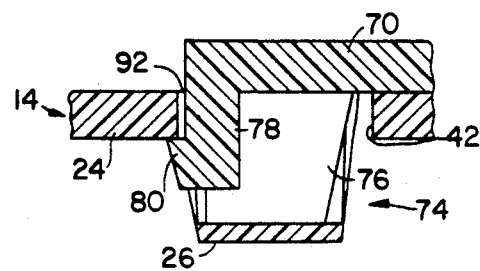
FIG. 6 is a side, cross-sectional view of a hook formed on the dust door extension engaged in an opening formed in the tape cassette cover.
Figure 7:
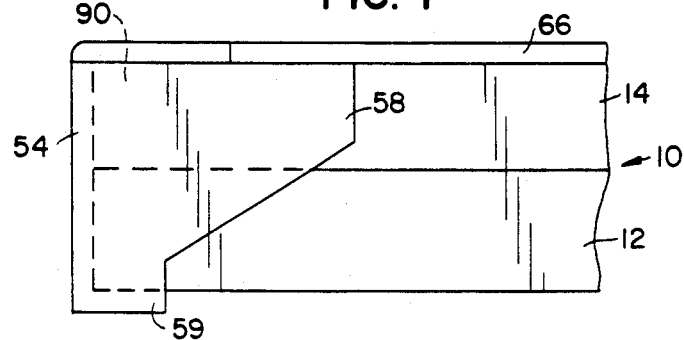
FIG. 7 is a side view of the removable dust door assembled on the cover.
Figure 8:
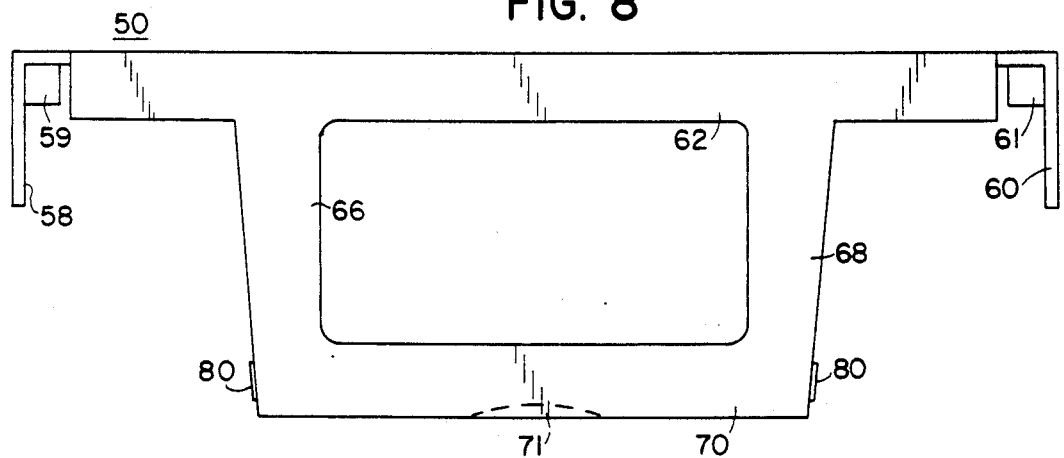
FIG. 8 is a top view of the removable dust door.
Figure 9:
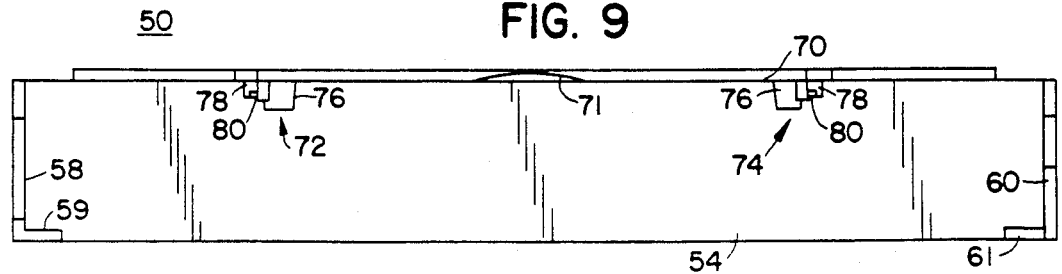
FIG. 9 is a front view of the removable dust door.

FIG. 1 illustrates a video tape cassette according to the present invention, the cassette being indicated generally by reference number 10. The cassette 10 includes a shell member or base 12 and another shell member or cover 14, each made of a plastic resin. The assembled base 12 and cover 14 accommodate a pair of tape reels 16 and 18 in a known manner. As shown in FIGS. 1 and 3, each of the tape reels 16 and 18 includes a hub 20 and 22, respectively, for winding magnetic recording tape 23 therearound. The tape reels 16 and 18 each include a pair of flanges 21, fixed coaxially on the top and bottom of the hubs 20 and 22, for protection of the upper and lower edges of the tape 23.

At a central portion of the cassette cover 14 is a planar area 24, at which spaced reel springs 26 and 28 are formed of the same material as the cassette cover 14, in the same mold. The springs 26, 28 are elongated springs molded integrally of the cassette cover 14, in the preferred embodiment.

Figure 2:
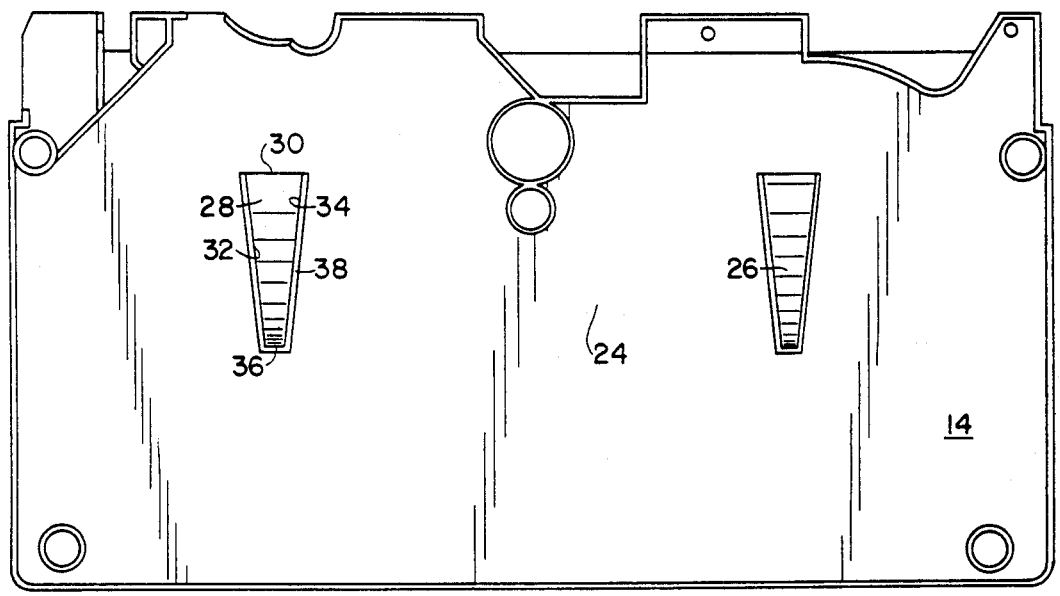
FIG. 2 is a bottom view of the reel springs formed in the cover.

Preferably, as shown best in FIGS. 1 and 2, each spring 26, 28 includes a base 30 connected to the central planar area 24 of the cover 14. Each spring 26, 28 is planar and extends at an angle of about 20°–25° relative to the plane of the area 24, in a direction away from the dust door 13 at the front of the cassette 10 and downwardly toward the cassette base 12. This angle may be modified depending upon the resin chosen and the thickness of the springs 26, 28. Each spring 26, 28 includes two converging sides 32 and 34 terminating in a straight free end 36. The sides 32, 34 could, of course, be parallel instead. Each spring 26, 28 is spaced adjacent sides 32, 34 and end 36 from the cover 12, as shown by reference numeral 38, which allows the spring 26, 28 to flex freely relative to the cassette cover 14. This spacing also creates openings 42, 44 into which projections 72, 74 of the removable dust door 50 extend, as discussed below.

As shown in FIG. 3, when the cover 14 and base 12 are mated, the springs 26, 28 are abutted and pushed by the tape reel hubs 20, 22 to flex upward toward the area 24 as shown by arrow "A." As a result, a portion 40 of the spring 26, 28 presses against the top 43 of the hubs 20, 22 to bias the hubs 20, 22 downwardly as indicated by arrow "B."

According to the present invention, if a defect is found in, e.g. the base 12 after the base 12 and cover 14 are assembled, the cassette 10 can merely be disassembled and the cover 14, including the reel springs 26, 28, can be re-used: the base 12 can be melted down and re-formed, if necessary.

A benefit of this reel spring invention is that there is no need to stamp a spring from a flat sheet of stainless steel. The reel spring 26, 28 is made from the same material as the cassette cover 14. Thus, the prior art steps for manufacturing the stamped spring are non-existent since the spring stamping, hole forming, assembly, etc. steps of the prior art can be eliminated.

With the present invention, there is no need to modify the mold for forming the cassette base 12, only the mold for the cover 14 needs to be modified.

Further, the cost of producing a stamped leaf spring is non-existent since no metal is used: less expensive plastic can be used to make the reel springs. Further, plastic material previously occupying part of the cassette cover is merely transformed into the springs 26, 28.

Also, the likelihood of the spring becoming dislodged during assembly is eliminated. These features, of course, further lead to reducing the overall cost of the cassette.

Moreover, if there is a need to re-cycle the cover (e.g., if a tape cassette return policy should be instituted in the future to conserve energy and materials much the same as is now done with plastic bottles), there is no need to separate a metal spring from the plastic cover. This benefit decreases recycling costs, facilitates re-melting of the cassette cover for re-use of the plastic, and generally makes re-cycling more attractive.

As shown particularly in FIGS. 4–9, the tape cassette 10 according to the present invention also includes a removable dust door 50. A front portion 52 of the dust door 50 includes an elongated wall 54, a perpendicular wall 56, left and right corners 58, 60, and lower retainers 59, 61. The wall 54 serves substantially to protect the tape 23 from debris, contact, etc., when the dust door 50 is connected to the cassette 10. The front wall 54 of the dust door 50 can also receive advertising, labeling, etc.

A rear portion 62 of the dust door 50 includes an extension 64 having two arms 66, 68 extending substantially perpendicular from the wall 56 and being connected to a third arm 70, which is parallel to the wall 56. The third arm 70 includes a curved recess 71 which can receive the user's thumb nail to facilitate removal of the dust door 50.

The dust door 50 also includes a pair of projections 72 and 74. The projections 72, 74 are preferably formed integrally of the dust door 50 during molding thereof. The projections 72, 74, as can be seen in FIGS. 4–6 and 9, include a planar base member 76, and an elongated planar, perpendicular member 78. The perpendicular member 78 includes a hook member 80. Each of the members 76, 78, 80 is formed at the intersections of the arms 66, 68 and 70.

The openings 42, 44 formed in the cassette cover 14 receive the projections 72, 74, respectively, when the dust door 50 is moved into the closed position on the tape cassette 10. In this way, debris, dust, etc. is prevented from entering the openings 42, 44 when the cassette 10 is not in use.

More particularly, FIG. 5 is a perspective view of the dust door 50 according to the present invention as it is being disengaged from or being connected to the cassette 10. In regard to connection, the extension 64 of the dust door 50 is moved at a slight upward angle toward the cassette 10. The dust door corners 58, 60 are generally configured to be received by the cassette recessed front corners 90, whose shapes are generally dictated by the conventional dust door shape. The retainers 59, 61 are received by the front lower edges of the cassette base 12. The extension 64 is pushed downwardly against the cassette cover 14 so that the projections 72, 74 enter the openings 42, 44 and the hooks 80 snap under the outer edge 92 of the openings 42, 44.

The projections 72, 74 serve the purpose of abutting and depressing the molded springs 26, 28. This helps to maintain the resiliency of the plastic springs 26, 28 for the expected useful life of the cassette 10. For example, the projections 72, 74 ensure that the springs 26, 28 are not under load during storage or shipment (which may entail a hot environment). A plastic spring could lose integrity with time under load and heat conditions.

In regard to disengagement, the reverse steps are followed. That is, the extension 64 is lifted slightly upward and slightly flexed by placing the thumb nail in the curved recess 71, the projections 72, 74 pop out from under the edges 92 of the openings 42, 44 and the dust door 50 is removed, which exposes the tape 23 to the tape player/recorder.

It is noted that disengagement/connection can occur with the tape cassette base 12 on bottom or top. In either position, the cassette 10 can be held, e.g. in the left hand, the dust door 50 can be held in the right hand, and the dust door 50 can be pulled off for disengagement and pushed on for engagement.

The closed position of the dust door 50 is characteristic of when the tape cassette 10 is not being operated by the tape player/recorder, e.g., during shipping, handling, storage, etc. In this position, the dust door 50 keeps the tape free from dust, contact, etc. The cassette with the dust door thereon cannot be mistakenly inserted in the tape player/recorder because the added thickness provided by the dust door prevents its receipt by the tape player/recorder. The user must remove the dust door 50 from the closed position as described above before loading the cassette in the tape player/recorder. The dust door 50 is then put aside until use of the tape cassette 10 in the tape player/recorder is completed.

Figure 10:
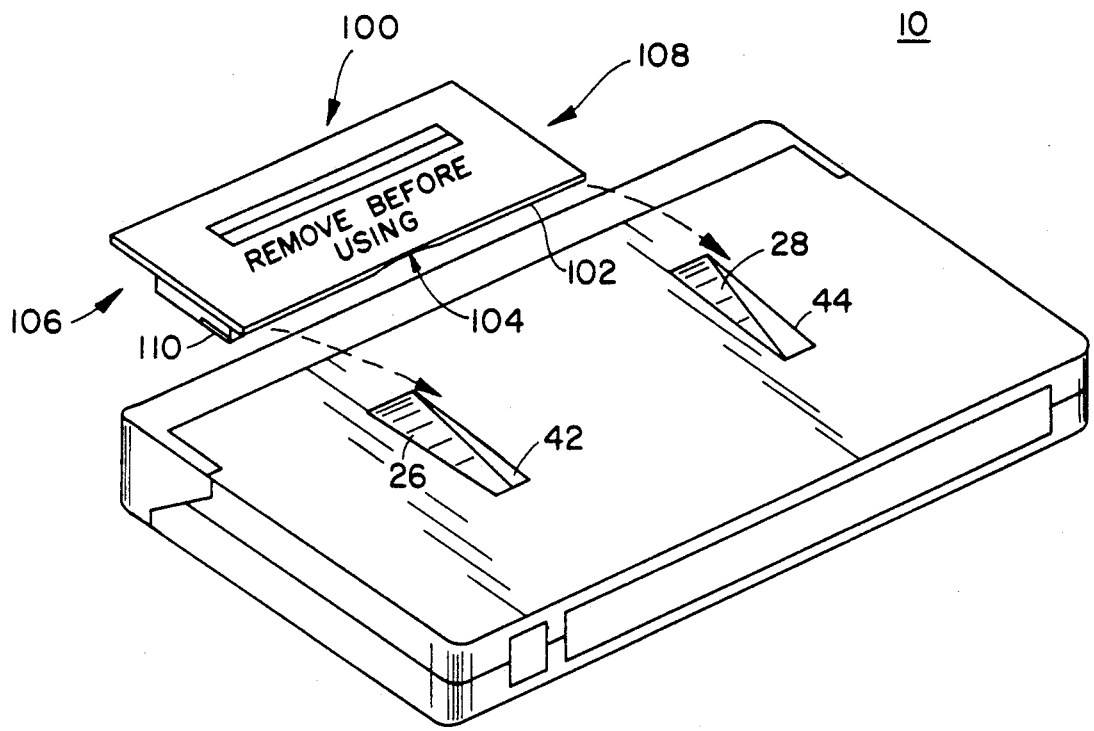
FIG. 10 is a perspective view of a removable member used with the first embodiment described above.

With the first embodiment described above, a conventional dust door is used. With this first embodiment, it is also desirable to incorporate a separate member which both closes the openings 42, 44 and abuts the springs 26, 28, just like the above-described extension 64 does. More particularly, as shown in FIG. 10, the tape cassette 10 can include a removable member 100 which is substantially rectangular. A front portion 102 includes a curved recess 104 which can receive the user's thumb nail to facilitate removal.

The member 100 also includes a pair of identical projections 106 and 108 (not shown). The projections 106, 108 are preferably formed integrally of the member 100 during molding thereof and are the same as the projections 72, 74 described above, including hook members 110.

In regard to attaching the member 100, the member 100 is moved toward the cassette 10 and pushed downwardly against the cassette cover 14 so that the projections 106, 108 enter the openings 42, 44 and the hooks 110 snap under the outer edge of the openings 42, 44. In this way, debris, dust, etc. is prevented from entering the openings 42, 44 when the cassette 10 is not in use.

The projections 106, 108 also serve the purpose of abutting and depressing the molded springs 26, 28. This again helps to maintain the resiliency of the plastic springs 26, 28. That is, the projections 106, 108 ensure that the springs 26, 28 are not under load during storage, shipment, etc.

The user must remove the member 100 from the closed position described above before loading the cassette 10 in the tape player/recorder. The member 100 is then put aside until use of the tape cassette 10 in the tape player/recorder is completed.

Thus, the present invention adequately addresses a void created by the flex allowance of the springs, so that during shipment or storage, the hubs are held tight against the base, but the spring is doing no work. This void is compensated for by the removable dust door 50 or removable member 100 described above. In either case, the projections 72, 74 and 106, 108, respectively, abut the springs 26, 28, thereby pushing the tape reels against the base, where they are locked against rotation as described above, by other means. The removable dust door 50 or member 100 also covers the openings 42, 44 formed around the springs 26, 28 to prevent debris from entering the cassette 10.

As can be seen from the above description, one embodiment of the present invention combines the conventional, separate, multi-pieced, spring biased dust door and dust door latch into a single member. Further, this single member can be efficiently manufactured as one piece using plastic molding, and assembly is greatly facilitated compared with the conventional counterparts. The down time on the assembly stations characteristic of assembly problems with the conventional counterparts is also eliminated.

This relatively simple design allows for automated assembly of the removable dust door on the tape cassette during manufacture. The design also allows the consumer to easily remove the dust door, put the tape into a tape player/recorder for use, remove the tape after use and reattach the dust door.

Also, there is no need to significantly change the standards set for the cassette or the tape player/recorder design or operation.

Further, since it is a common practice to make the cassette and load the tape therein, the present invention allows the dust door to be added after the tape is loaded and the cassette is assembled. This facilitates tape loading.

Moreover, overall cassette assembly is facilitated because, particularly, spring loading of a dust door and dust door latch is eliminated. Also, the prior practice of having to capture the dust door between the cassette base and cover during mating thereof is eliminated. Finally, operation is more reliable because there are no moving parts to this dust door/reel leaf spring combination.

The foregoing is considered illustrative only of the principles of the invention. Further, since numerous modifications and changes will readily occur to those skilled in the art, it is not desired to limit the invention to the exact construction and operation shown and described. For example, the above-described tape cassette has been shown to be of the type intended for use in video tape players/recorders. However, the invention can be similarly applied to tape cassettes for use in audio or other playing/recording apparatus. Moreover, although the reel spring is characterized as being formed on the cover, the spring could be formed on the cassette base, if desired. Finally, a plurality of different spring shapes, e.g., curved, triangular, etc. are possible, as long as one portion biases against a tape reel hub. Also, the spring could be a bowed rectangular shape, connected at both ends to the cassette, and could be oriented parallel to the axis of the cassette. Accordingly, all suitable modifications and equivalents may be resorted to that fall within the scope of the invention and the appended claims.

We claim:

1. A tape cassette having an open front portion, comprising:
   (a) a first cassette shell member;
   (b) a second cassette shell member connected to the first cassette shell member;
   (c) at least one tape reel positioned within the two shell members and movable between first and second positions, the first position abutting the second cassette shell member and the second position being between the first and second cassette shell members;
   (d) spring means molded integrally with the first cassette shell member to normally urge the at least one tape reel from the second position to the first position; and
   (e) a removable dust door, one portion of which connects at the open front portion of the cassette and another portion of which includes projection means that abuts the spring means, to hold the at least one tape reel in the first position.

2. The tape cassette as recited in claim 1, wherein the spring means comprises:
   a pair of planar reel springs spaced apart form each other, each spring biased against a tape reel.

3. The tape cassette as recited in claim 2, wherein each spring further comprises:
   a first end integrally molded with the first cassette shell member, an opposite free end and two opposing sides.

4. A tape cassette having an open front portion, comprising:
   (a) a first cassette shell member;
   (b) a second cassette shell member connected to the first cassette shell member;
   (c) at least one tape reel positioned within the two shell members and movable between first and second positions, the first position abutting the second cassette shell member and the second position being spaced between the first and second cassette shell members;
   (d) openings formed in the first cassette shell member, in which are formed spring means molded integrally with the first cassette shell member to abut and bias the at least one tape reel from the second position to the first position;
   wherein the spring means includes
      a pair of spaced, planar reel springs;
   wherein each spring includes
      a first end integrally molded with the first cassette shell member, an opposite free end and two opposing sides; and
   (e) a removable member for covering the openings formed at the springs in the first cassette shell member and including means to abut the springs and hold the tape reels in the first position and.

5. The tape cassette as recited in claim 4, further comprising a dust door for covering the front open portion of the cassette.

6. The tape cassette as recited in claim 4, wherein the removable member includes a portion which is a dust door for covering the open portion of the cassette.

7. The tape cassette as recited in claim 4, wherein the abutting means includes:
   projections formed on the removable member terminating in hooks,
   wherein the springs are contacted by the projections and the hooks engage the openings in the first cassette shell member.

8. A tape cassette, comprising:
   (a) a first cassette shell member;
   (b) a second cassette shell member connected to the first cassette shell member;
   (c) two tape reels positioned within the two shell members and movable between first and second positions, the first position abutting the second cassette shell member and the second position spaced between the first and second cassette shell members; and (d) edges defining openings formed in the first cassette shell member, in which are formed a pair of planar reel springs integrally molded to be spaced apart from each other and extend from the first cassette shell member to abut and bias the tape reels from the second position into the first position;
(e) a removable dust door;
(f) projections formed on the removable dust door terminating in hooks, wherein the springs are contacted by the projections to hold the tape reels in the first position, and the hooks engage at the edges of the openings formed in the first cassette shell member.

9. A method for biasing tape reels in a tape cassette, comprising the steps of:
  (a) forming a tape cassette to include
    (1) a first shell member including integrally molded spring means,
    (2) a second shell member; and
    (3) a pair of tape reels positioned on the second shell member and movable between first and second positions, the first position abutting the second shell member and the second position being spaced between the first and second shell members;
  (b) mating the first and second shell members with the pair of tape reels therebetween so that the spring means abuts and biases the tape reels into the first position; and
  (c) assembling a removable dust door with projections onto the cassette so that the projections abut the spring means and hold the tape reels in the first position.

10. The method as recited in claim 9, further comprising the step of:
  (d) after the step of assembling the dust door, removing the dust door.

11. A tape cassette having an open front portion, comprising:
  (a) a first cassette shell member;
  (b) a second cassette shell member connected to the first cassette shell member;
  (c) at least one tape reel positioned within the two shell members and movable between first and second positions, the first position abutting the second cassette shell member and the second position being between the first and second cassette shell members;
  (d) a spring molded integrally with the first cassette shell member to normally urge the at lest one tape reel from the second position to the first position; and
  (e) a removable dust door, one portion of which connects at the open front portion of the cassette and another portion of which includes a projection that abuts the spring, to hold the at least one tape reel in the first position.

12. A method for biasing tape reels in a tape cassette, comprising the steps of:
  (a) forming a tape cassette to include
    (1) a first shell member including integrally molded springs,
    (2) a second shell member, and
    (3) a pair of tape reels positioned on the second shell member and movable between first and second positions, the first position abutting the second shell member and the second position being spaced between the first and second shell members;
  (b) mating the first and second shell members with the pair of tape reels therebetween so that the springs respectively abut and bias the tape reels into the first position.
  (c) assembling a removable dust door with projections onto the cassette so that the projections abut the springs and hold the tape reels in the first position.

* * * * *